United States Patent Office 3,322,825
Patented May 30, 1967

3,322,825
PROCESS FOR THE MANUFACTURE OF SORBIC ACID HALIDES
Hans Fernholz, Bad Soden, Taunus, Hermann Neu, Neu-Isenburg, and Hans-Joachim Schmidt, Frankfurt am Main, Germany, assignors to Farbwerke Hoechst Aktiengesellschaft vormals Lucius & Brüning, Frankfurt am Main, Germany, a corporation of Germany
No Drawing. Filed Sept. 1, 1964, Ser. No. 393,732
Claims priority, application Germany, Sept. 4, 1963, F 40,665; May 13, 1964, F 42,862; July 18, 1964, F 43,488
7 Claims. (Cl. 260—544)

The present invention relates to a process for the manufacture of sorbic acid halides.

It is known that sorbic acid chloride (hexadiene-2,4-oylchloride-(1) can be obtained by the conventional processes for making carboxylic acid chlorides by reacting sorbic acid or its alkali metal salts with an inorganic or organic acid chloride. Sorbic acid chloride has hitherto been obtained, for example, by the reaction of sorbic acid with phosphorus pentachloride or of the sodium or potassium salt of sorbic acid with phosphorus trichloride or by boiling sorbic acid with thionyl chloride in an inert solvent, for example benzene. It has also been described to make sorbic acid chloride by reacting sorbic acid with oxalyl chloride. All the processes hitherto known this start from the free acid or its alkali metal salts.

Now we have found that sorbic acid halides can be obtained in excellent yields by subjecting the polymer product obtained in known manner from crotonaldehyde and ketene in the presence of fatty acid salts of bivalent metals serving as catalysts, which product is obtained, as is known as primary or intermediate product in the manufacture of sorbic acid, to a treatment with an inorganic or organic acid halide. This is surprising since the reaction product obtained from ketene atnd crotonaldehyde constitutes a neutral polyester of 3-hydroxyhexenic-(4) acid-(1) ($\beta$-hydroxy-$\alpha,\beta$-dihydrosorbic acid) which contains no free carboxylic group. It has not been known hitherto that an ester of this kind is capable of reacting similarly to a free carboxylic acid with an acid halide.

When carrying out the process of the invention it is advantageous to use reaction conditions as they are generally required and used for converting a carboxylic acid into its halide. For example, the above mentioned polyester may be reacted with an acid halide in a manner analogous to that used for reacting sorbic acid. Especially the reaction temperature to be applied depends on the nature of the acid halide used. The polyester reacts, for example, with thionyl chloride and oxalyl chloride, respectively, already at room temperature so that only a short subsequent heating to about 100° C. and 70° C., respectively is required to achieve a complete reaction. The reaction of the polyester, for example, with phosphorus pentachloride, phosphorus oxychloride or phthalic acid dichloride, however, is advantageously carried out altogether at elevated temperature, advantageously at a temperature within the range of 40 to 120° C.

For the process of the invention inorganic and/or organic acid halides may be used. Advantageously, sorbic acid chloride is obtained from polyester and an acid chloride. It is, however, also possible to make the other sorbic acid halides in analogous manner.

Inorganic acid halides particularly suitable for use in the process of the invention are those of sulfur or phosphorus, for example thionyl chloride, phosphorus pentachloride, phosphorus oxychloride and phosphorus trichloride. Suitable organic acid halides are those which can be reacted with a free carboxylic acid to obtain the corresponding carboxylic acid halide, particularly oxalyl chloride, phthalic acid dichloride or benzotrichloride. According to Houben-Weyl, vol. VIII, 4th edition, page 471, paragraph 3, these compounds are acid halides containing more than one available mobile halogen atom. Benzotrichloride has to be regarded in this connection as the perchloride of benzoic acid. It is also possible to use mixtures of halides.

The amounts of acid halide necessary for the reaction depend substantially on their halogen content, provided that optimum reaction conditions are used. For example, the reaction of 112 grams polyester (=1 mole of the monomer on which the polyester is based) requires 1 to 1.6 moles thionyl chloride, 0.6 to 0.9 mole phosphorus oxychloride or 0.3 to 0.6 mole phosphorus pentachloride if the reaction with phosphorus oxychloride or phosphorus pentachloride is carried out in known manner in the presence of an inorganic salt such as sodium sulfate or calcium chloride and an organic base such as pyridine. If, however, phosphorus pentachloride is reacted with the polyester without the addition of the aforesaid substances, 1 to 1.6 moles of this acid chloride are required.

In some cases the use of organic acid halides is more advantageous than the use of inorganic acid halides. It has been found that in the reaction of the polyester with inorganic acid halides, particularly when relatively large batches are used or the process is carried out continuously, impurities consisting of undesired resins may appear in the crude reaction product. This disadvantage which arises in some cases is not observed when organic acid halides are used.

It is often advantageous to perform the reaction of the polyester with the acid halide in the presence of an appropriate inert solvent or diluent. For this purpose there may advantageously be used aliphatic, cycloaliphatic or aromatic hydrocarbons or their chlorine-substituted derivatives such as hexane, heptane, octane, cyclohexane, benzene, toluene, xylene, carbon tetrachloride and chlorobenzene or mixtures of these compounds.

We have furthermore found that in the preparation of sorbic acid chloride from polyester and an inorganic acid chloride a particularly pure product can be obtained in improved yields by carrying out the reaction between the polyester and the inorganic acid chloride in the presence of N,N-disubstituted amides of low molecular carboxylic acids, N-substituted lactams and/or N-acylated heterocyclic bases. This mode of proceeding has the advantage that it can particularly well be carried out continuously. The N-substituted nitrogen compounds to be used in the process of the invention have the formula

in which R represents hydrogen or a low alkyl group and $R_1$ and $R_2$ each represent a hydrocarbon radical.

In the simplest case, the compounds are N,N-disubstituted amides of low carboxylic acids, particularly those containing 1 to 4 carbon atoms. The radicals $R_1$ and $R_2$ are advantageously identical or different alkyl groups which generally have a low molecular weight, for example, those having 1 to 4 carbon atoms. They may also be cycloalkyl-, aralkyl- or aryl groups. As examples there may be mentioned N,N-dimethyl formamide, N,N-diethyl formamide, N,N-dimethyl acetamide, N,N-diethyl acetamide and N,N-dibutyl propionamide.

When R and $R_1$ are alkyl groups they may be linked to one another to form a lactam ring having advantageously 5 to 7 ring members, $R_2$ representing a hydrocarbon radical, advantageously an alkyl group. Suitable lactams are, for example, N-methylpyrrolidone, N-ethylpyrrolidone, N-ethylpiperidone, N-hexylpiperidone and N-ethylcaprolactam.

When $R_1$ and $R_2$ represent alkyl groups they may be linked to one another via a carbon atom or an oxygen atom to form a heterocyclic ring having advantageously 5 or 6 ring members. In this case the substances are N-acylated heterocyclic bases, for example N-acetylpiperidine and N-acetylmorpholine.

The above mentioned compounds which may all be regarded as carboxylic acid amides may be used either alone or in admixture with one another.

In a preferred form of executing this modification of the process of the invention, a mixture of the polyester and the carboxylic acid amide, advantageously in one of the above solvents, is placed in the reaction vessel and the inorganic acid chloride, advantageously phosphorus oxychloride or phosphorus pentachloride, is added in a manner such that the temperature remains below 120° C., advantageously below 100° C. The use of a solvent is advantageous since overheating may occur in the reaction mixture during the reaction of the undiluted starting materials so that it may, under circumstances, be difficult to control the course of the reaction. It is, however, not absolutely necessary to apply the above method of proceeding. It is also possible, for example, to vary the order of succession in which the individual reactants are added.

The carboxylic acid amide or the mixture of the carboxylic acid amides is generally added in an amount of at least 0.1 mole, and advantageously in an amount within the range of 0.2 to 2 moles, calculated on 100 grams polyester. In many cases the amount of carboxylic acid amide or mixture of carboxylic acid amides does not exceed 1 mole calculated on 100 grams polyester. However, there is no critical upper limit to the amount of carboxylic acid amides to be added.

The process of the invention has the advantage that not sorbic acid but its precursor is used for the production of sorbic acid halide thus saving a process step.

Owing to their great reactivity, sorbic acid halides, particularly sorbic acid chloride, have a wide range of application. They may be reacted, for example, with hydroxyl compounds to obtain sorbic acid esters, with water to obtain sorbic acid or with amino compounds to obtain amides which are of importance as preservatives having an anti-microbe action or as monomers to be used for the manufacture of plastics.

The following examples serve to illustrate the invention but they are not intended to limit it thereto, the parts being by weight. As starting material, a polyester was used which had been obtained from ketene and crotonaldehyde by the process as described in German Patent No. 1,042,573.

Example 1

In the course of 30 minutes, 150 grams thionyl chloride were added drop by drop to a solution of 112 grams polyester in 200 cc. toluene, while stirring. Lively formation of hydrochloric acid and sulfur dioxide set in immediately. When all of the thionyl chloride had been added, the mixture was heated for 15 minutes on a steam bath and the sorbic acid chloride was purified by fractional distillation. The yield amounted to 119 grams (boiling point 64 to 68° C. under a pressure of 8 millimeters of mercury).

Example 2

In the course of 1 hour, 1000 grams thionyl chloride were added drop by drop to a mixture of 672 grams polyester and 400 grams hexane. The mixture was then boiled for 1 hour under reflux. By fractional distillation 685 grams sorbic acid chloride (boiling point 79° C. under a pressure of 16 millimeters of mercury) were obtained.

Example 3

A mixture of 112 grams polyester, 100 grams sodium sulfate, 1 liter toluene, 118 grams phosphorus oxychloride and 5 cc. pyridine was heated for 1 hour at 90° C. and subsequently boiled under reflux for 3 hours. After cooling, the product was separated from the sodium sulfate by suction-filtration. By fractional distillation of the crude product 98 grams sorbic acid chloride (boiling point 73 to 75° C. under a pressure of 12 millimeters of mercury) were obtained.

Example 4

A mixture of 112 grams polyester, 100 grams sodium sulfate, 1 liter toluene, 52 grams phosphorus pentachloride and 5 cc. pyridine was heated at 80° C. for 2 hours and subsequently boiled under reflux for 2 hours. After cooling, the crude product was separated from the sodium sulfate by suction-filtration and distilled. The yield amounted to 106 grams sorbic acid chloride (boiling point 95° C. under a pressure of 35 millimeters of mercury).

Example 5

A solution of 56 grams polyester in 100 cc. benzene was added drop by drop to a mixture of 115 grams phosphorus pentachloride and 100 cc. benzene. On heating to a temperature of 60 to 80° C., formation of hydrogen chloride occurred. The reaction mixture was stirred for 2 hours at 80° C. and subsequently subjected to a fractional distillation. The yield amounted to 56 grams sorbic acid chloride. When carbon tetrachloride was used as solvent, similar yields were obtained.

Example 6

In a vessel provided with a stirrer and a reflux condenser, a solution of 165 parts oxayl chloride in 100 parts toluene was added at room temperature, while stirring, to a solution of 112 parts polyester in 150 parts toluene. The temperature was not allowed to exceed 35° C. After all of the oxayl chloride solution had been added, the reaction mixture was allowed to stand at room temperature for 1 to 2 hours, then heated at 60° C. for 30 minutes, and the sorbic acid chloride which had been formed was purified by distillation. 120 parts of sorbic acid chloride (boiling point 72° C. under a pressure of 10 millimeters of mercury) were obtained.

Example 7

204 parts phthalic acid dichloride were added at a temperature of 70 to 80° C., while stirring, to a solution of 112 parts polyester in 200 parts toluene. Hydrogen chloride was formed while a weakly exothermic reaction took place. When all of the phthalic acid dichloride had been added, the reaction mixture was heated for 1 hour at 90° C. and subsequently it was heated for 4 hours under reflux. After cooling, the phthalic acid anhydride which had separated was suction-filtered and the filtrate was subjected to a fractional distillation. The sorbic acid chloride passed over at a boiling point of 72 to 74° C. under a pressure of 10 millimeters of mercury. 115 parts sorbic acid chloride were obtained.

Example 8

224 grams polyester were dissolved in 250 cc. dry benzene, and 73 grams dimethylformamide were then added. The mixture was heated to 70° C. At that temperature 215 grams phosphorous oxychloride were added drop by drop within 1 hour, while stirring. The reaction mixture was then kept for a further hour at a temperature of 70 to 80° C. By fractional distillation of the reaction mixture 242 grams sorbic acid chloride (boiling point 72 to 74° C. under a pressure of 10 millimeters of mercury) were obtained.

Example 9

112 grams polyester, 30 grams dimethylformamide and 100 grams phosphorus pentachloride were heated in 200 cc. benzene for 2 hours at a temperature of 70 to 80° C. By distillation 118 grams sorbic acid chloride were obtained.

Example 10

In the course of 1 hour, 215 grams phosphorus oxychloride were added, drop by drop, at a temperature of 70 to 80° C. to a mixture of 224 grams polyester, 80 grams diethyl acetamide and 300 cc. benzene. The mixture so obtained was boiled for 1 hour under reflux. By distillation 240 grams sorbic acid chloride were obtained.

When the experiment was carried out under the same conditions but while using, instead of 80 grams diethyl acetamide, 100 grams N-acetylmorpholine in one instance, and 120 grams N-ethylcaprolactam in another instance, 203 grams and 195 grams, respectively, of sorbic acid chloride were obtained.

Example 11

A solution of 336 grams polyester and 100 grams dimethylformamide in 375 cc. dry benzene was reacted at 80° C. with 323 grams phosphorus oxychloride in the manner described in Example 8 in a 2-liter vessel provided with a stirrer and a reflux condenser. After a time of reaction of 1 hour, a solution of 336 grams polyester and 100 grams dimethylformamide in 375 cc. benzene and, separately from this solution, 323 grams phosphorus oxychloride were introduced per hour into the reaction vessel, while the same amount of reaction mixture was simultaneously drawn off through an overflow. 338 grams sorbic acid chloride were obtained per hour.

We claim:

1. A process for preparing a sorbic acid halide which comprises reacting a polyester obtained by reaction of crotonaldehyde with ketene in the presence of a fatty acid salt of a bivalent metal with an inorganic or organic acid halide at a temperature below 120° C.

2. A process for preparing sorbic acid chloride which comprises reacting a polyester obtained by reaction of crotonaldehyde with ketene in the presence of a fatty acid salt of a bivalent metal with an inorganic or organic acid chloride at a temperature below 120° C.

3. The process defined in claim 2 wherein the inorganic acid chloride is thionyl chloride, phosporus pentachloride, phosphorus trichloride, phosphorus oxychloride or a combination thereof.

4. The process defined in claim 2 wherein the organic acid chloride is oxalyl chloride, phthalic acid dichloride, benzotrichloride or a combination thereof.

5. The process defined in claim 2 wherein the reaction between the polyester and the halide is carried out in the presence of an N,N-lower alkyl disubstituted amide of a low molecular weight carboxylic acid, an N-lower alkyl subtsituted lactam, an N-acetyl heterocyclic base or a mixture thereof.

6. The process defined in claim 2 wherein the reaction between the polyester and the halide is carried out in an inert solvent.

7. The process defined in claim 6 wherein the solvent is hexane, heptane, octane, cyclohexane, benzene, toluene, xylene, carbon tetrachloride, chlorobenzene or a mixture thereof.

References Cited

UNITED STATES PATENTS

| | | | |
|---|---|---|---|
| 3,056,830 | 10/1962 | Koopal et al. | 260—486 |
| 3,113,149 | 12/1963 | Probst et al. | 260—526 |
| 3,133,962 | 5/1964 | Hrubesch | 260—544 |
| 3,149,155 | 9/1964 | Seefelder | 260—544 |

OTHER REFERENCES

Houben-Weyl, "Methoden Der Org. Chem.," 4th edition, vol. 8, Oxygen Compounds III (1952), pp. 463–476.

LORRAINE A. WEINBERGER, *Primary Examiner.*

RICHARD K. JACKSON, *Examiner.*